Nov. 29, 1938.　　　　E. ALTENKIRCH　　　2,138,691
METHOD AND APPARATUS FOR CONDITIONING AIR
Filed Nov. 16, 1934　　　3 Sheets-Sheet 1
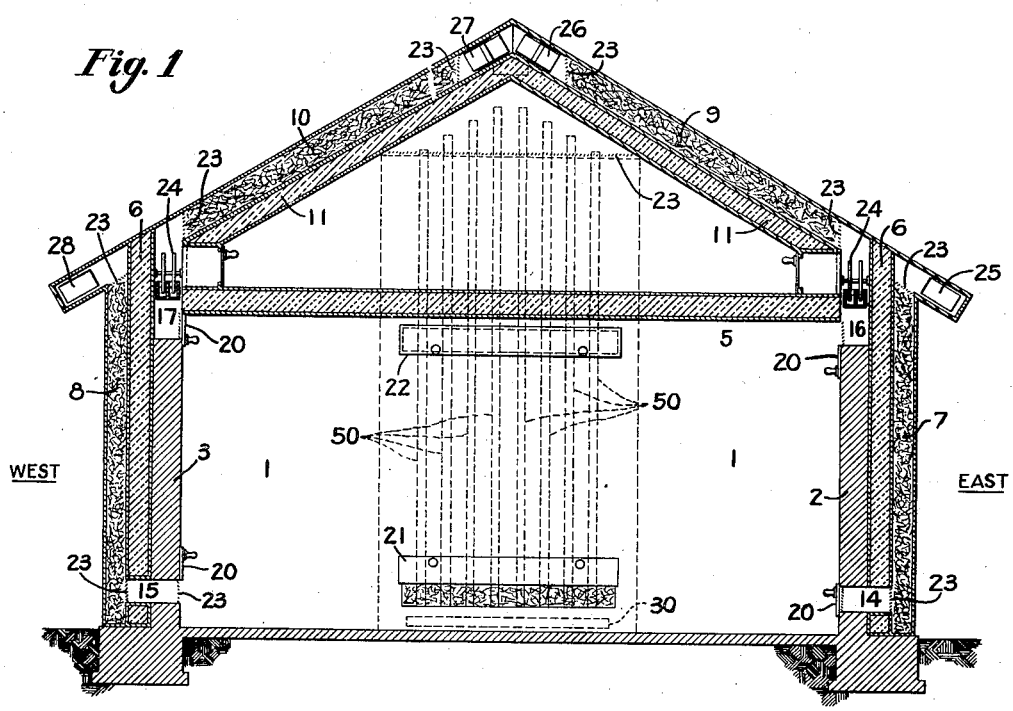
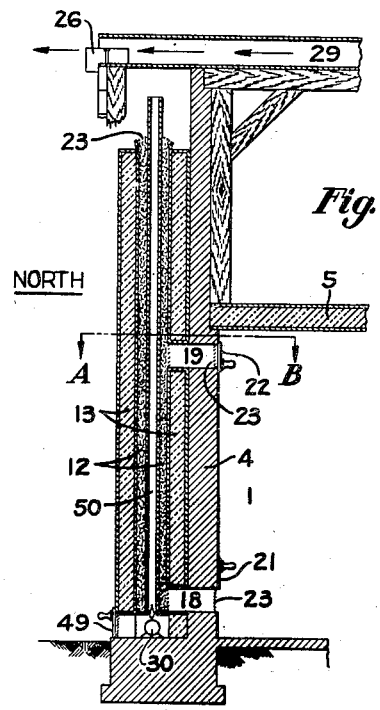
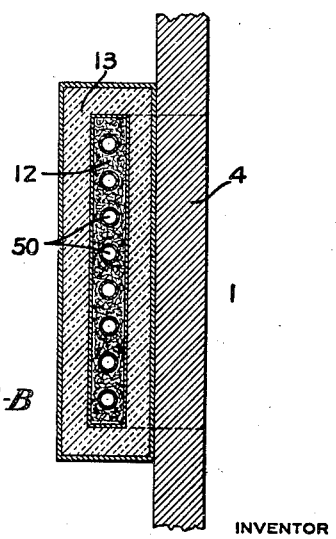
INVENTOR
Edmund Altenkirch
BY
Harry J. Bmarss
ATTORNEY Nov. 29, 1938.  E. ALTENKIRCH  2,138,691
METHOD AND APPARATUS FOR CONDITIONING AIR
Filed Nov. 16, 1934  3 Sheets-Sheet 2
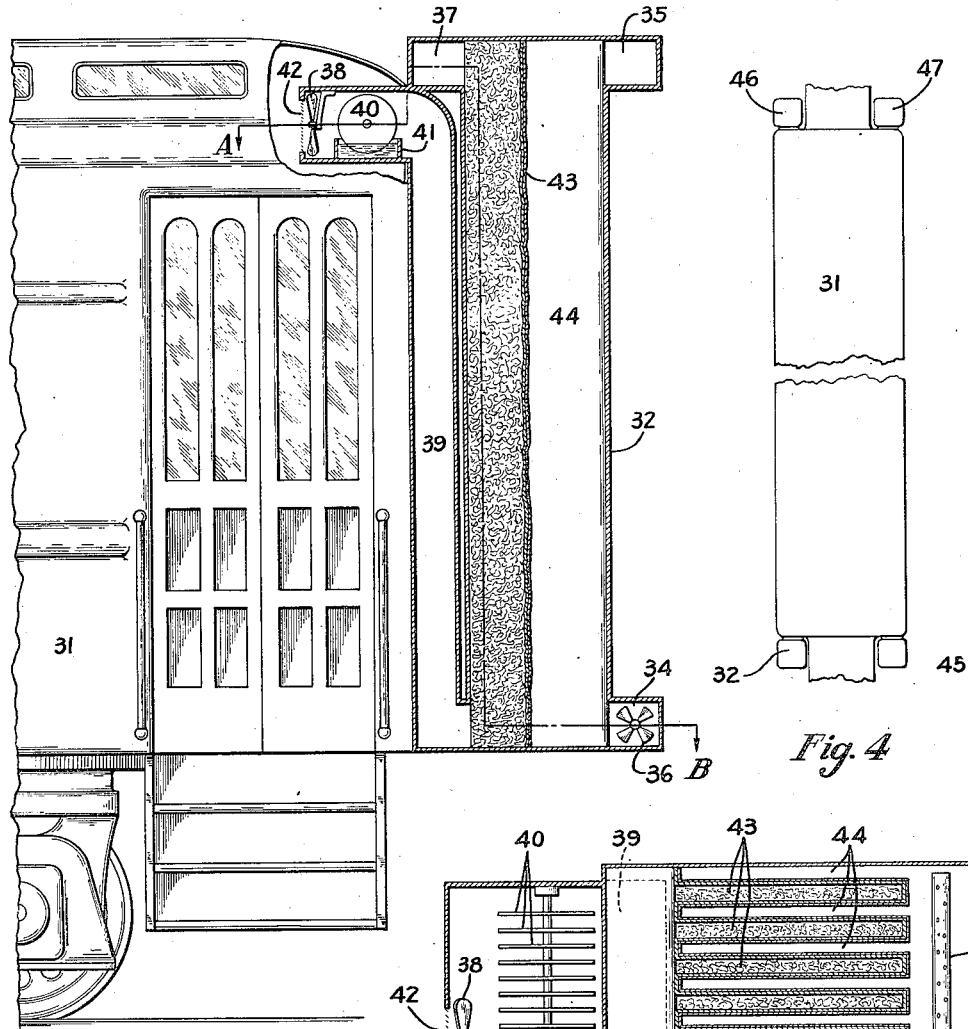
Fig. 5
Fig. 4
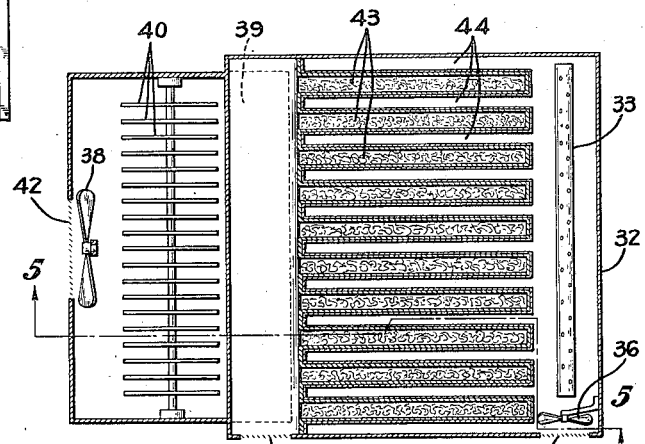
Section A-B
Fig. 6
INVENTOR
Edmund Altenkirch
BY
Harry S. Bucars
ATTORNEY

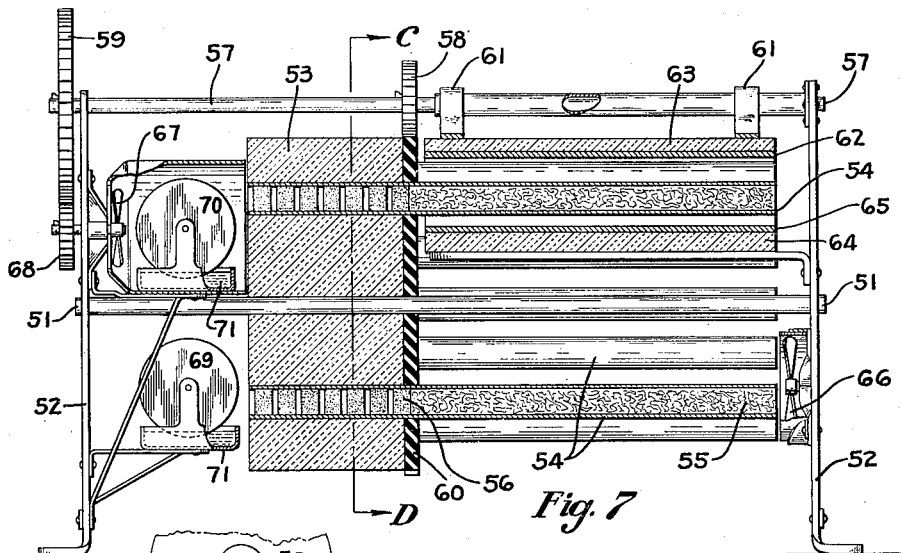
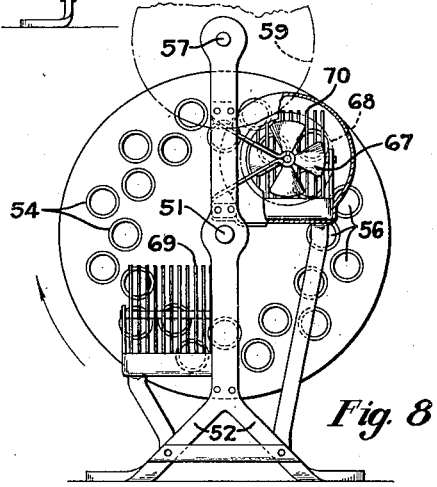
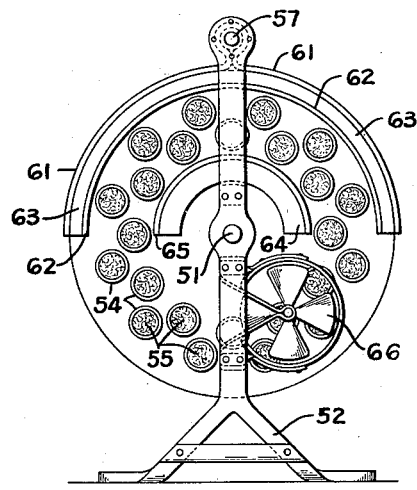
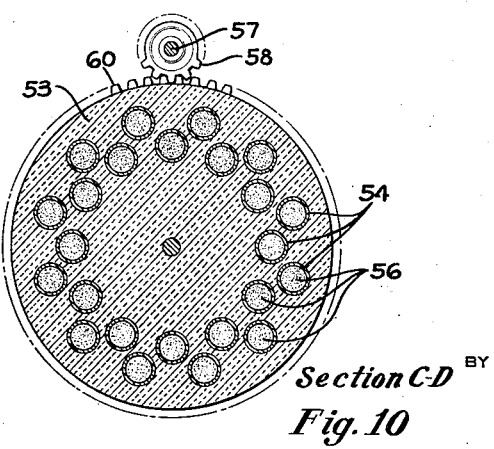

Patented Nov. 29, 1938

2,138,691

UNITED STATES PATENT OFFICE 2,138,691

METHOD AND APPARATUS FOR CONDITIONING AIR

Edmund Altenkirch, Neuenhagen, near Berlin, Germany

Application November 16, 1934, Serial No. 753,309
In Germany November 17, 1933

14 Claims. (Cl. 62—139)

This invention relates to air conditioning apparatus and more particularly to means for drying and cooling air.

In accordance with the invention at least four absorption vessels are successively warmed up one after the other, while air is passed therethrough to activate the absorption material therein. The vessels are then cooled and air to be conditioned is passed therethrough, so that the moisture in the air is absorbed by the absorption material in the vessels.

When the air to be conditioned is first passed through the activated material in a vessel, the air becomes very dry. Later, as the material becomes partially saturated, the air delivered from a vessel naturally has a higher moisture content, although still less than the entering air. If, according to the invention, several absorption vessels with material therein in various states of saturation are exposed to parallel currents of air, a medium or average dehumidification is obtained.

Two currents of air may flow through each vessel, one current of air being used to help activate the material when the material is heated, and the other current of air being that undergoing treatment to condition the air by drying it. These two currents of air preferably flow through each vessel in opposite directions. Circulation of these currents of air can be effected or supported by the lifting effect of the warmed air, especially if the absorption vessels are in open communication with the surrounding air at one end and are connected to a compartment separated from the surrounding air at the other end.

The intermittent heating and cooling of each vessel can be effected either by changing the position of the heating source or by successively bringing the absorption vessels into juxtaposition with the heating source.

If both ends of the absorption vessels are connected to a room to be conditioned, circulation of the air can be advantageously effected by fans. If the absorption vessels are air cooled, the fans which blow the air to be conditioned through the vessels can also move the air which cools the absorption vessels.

From the above description it will be apparent that the objects of the invention are to provide means for de-humidifying or drying air so that it may be supplied to a room to be conditioned, to provide novel means for activating the material which is used as absorbent so that it can be again used to dry air and to provide novel means for successively heating and cooling a vessel containing absorption material while passing currents of air therethrough so as to aid in the activating of the material and in the drying of the air to be conditioned.

Other objects and advantages will be apparent from the following description taken in connection with the accompanying drawings in which, Figure 1 is a diagram representing a house in vertical cross-section and illustrating one way of carrying out the principles of the present invention;

Figure 2 is a fragmentary cross-sectional view of the house illustrated in Figure 1, the section being taken at right angles to that illustrated in Figure 1;

Figure 3 is a horizontal cross-sectional view of the arrangement of Figure 2, the view being taken on the line AB of Figure 2;

Figure 4 is a plan view of a railroad car with air conditioning apparatus mounted on the four corners thereof;

Figure 5 is an enlarged view of one end of a railroad car shown in side elevation with air conditioning apparatus associated therewith, the air conditioning apparatus being shown partially in section;

Figure 6 is a fragmentary cross-sectional view of the arrangement of Figure 5, the view being taken on the line AB of Figure 5;

Figure 7 is a vertical cross-sectional view of a modified form of air conditioning apparatus constructed in accordance with the present invention;

Figure 8 is an end view of the apparatus of Figure 7, the view being taken from the lefthand side of the figure;

Figure 9 is another end view of the apparatus of Figure 7 as viewed from the right of the figure; and Figure 10 is a cross-sectional view of the apparatus shown in Figure 7, the view being taken on the line CD of Figure 7.

In Figures 1 to 3 of the drawing, a room to be conditioned is designated by 1. The room is located in a house the ridge of which extends from north to south. If the house is located in the Northern Hemisphere, the north, east and west walls contain air conditioning equipment. The room 1 has a wall 2 at the east side, a wall 3 at the west side and a wall 4 at the north side. The north wall 4 is shown from the side in Figure 2 and is shown in the section AB in Figure 3. The room is covered at the top by a heat insulating ceiling 5. Compartments or chambers 7 and 8 are provided adjacent walls 2 and 3. The walls 2 and 3 are separated from the chambers 7 and 8 by a heat insulating layer 6. Absorbent material is located in the chambers 7 and 8. This material may consist of wood shavings. In the same way the chambers 9 and 10 between the roof trees are separated from the lower side by a heat insulating layer 11. The chambers 9 and 10 are also filled with absorbent material. In the same manner, a chamber 12 may be located along the north wall 4 of the building and filled with absorbent material, as for instance silica gel, in baskets of metal screens. The chamber 12 is surrounded by a heat insulating material 13.

Chamber 7 is connected with the room 1 by conduit 14, chamber 8 by conduit 15, chambers 9 and 10 by conduits 16 and 17, and chamber 12 by conduits 18 and 19. Openings to conduits 14, 15, 16 and 17 can be closed by lids 20 is desired. Likewise conduit 18 may be provided with a lid 21 and conduit 19 with a lid 22. These lids may be used to regulate and distribute the conditioned air entering room 1. Screens 23 may be provided to prevent the entrance of foreign substances into the conduits. The upper portion of walls 2 and 3 may contain disks 24 made of porous material, which can be more or less moistened by causing them to rotate and dip into pans of water.

The upper end of the chamber 7 located on the east side of the building is connected to the portion of the roof which overhangs this wall and is connected to the atmosphere by an opening 25 in the eaves of the roof. Likewise the chamber 8 on the west wall is connected to the atmosphere by an opening 28 in the eaves of the roof. The roof compartments 9 and 10 also have their upper ends connected to the atmosphere and this is accomplished by the openings 26 and 27 near the ridge of the roof. Since the roof trees divide the compartments 9 and 10 into a number of inclined passages or channels, a space or passage 29 should be provided along the ridge of the roof as illustrated in Figure 2 so that these channels may all be connected to the atmosphere. While only a portion of the house is shown in Figure 1, and the openings 25, 26, 27 and 28 are illustrated as being located along the north edge of the roof, it will be apparent that the south edge of the roof may contain similar openings. Any of these openings may be closed in accordance with the direction of the wind so that the wind may be utilized to aid in the circulation of air through the compartments 7, 8, 9 or 10.

It will be apparent that the sun will shine on the compartments 7, 8, 9 and 10, that is on the compartments 7 and 9 in the morning and on the compartments 8 and 10 in the afternoon. Since the compartment 12 is located on the north side of the building it cannot be heated by the sun and must be heated artificially if the absorption material therein is to be activated. For heating the compartment 12 a small gas burner or the like, such as is illustrated at 30 in Figure 2, may be provided, this burner discharging into a number of vertically extending pipes 50 which pass up through the chamber 12 in heat exchange relation with the absorption material therein. For cooling the chamber 12, the pipes 50 may be connected to the atmosphere by removing the shutter 49 located over an opening connected to the lower ends of pipes 50. The shutter 49 may be used to regulate the cooling air flowing through the pipes 50, or it may also be used to regulate the amount of air supplied to the burner 30 for combustion purposes.

The system of Figures 1, 2 and 3 is operated mainly by sun radiation. During the night artificial heating is employed not only to activate the absorption material in the compartment 12 but also to cause circulation of the air in the room being conditioned.

To illustrate how the apparatus of Figures 1, 2 and 3 may be operated, let it be assumed that the wind is from the south and that the sun is shining. In the late forenoon the sun is shining full upon the chamber 9. It is also beginning to shine upon the chamber 10 while the chamber 8 on the west side of the house is still in the shade and the chamber 7 on the east is about to pass into the shade. As stated above, the chamber 12 on the north side of the house is in the shade all day long. At this time the artificial heating device 30 is not being operated, although of course a pilot light may be burning.

At this time the compartment 7 is still warm due to the heating it has received from the sun earlier in the morning. Consequently the air therein tends to rise and a current of air is set up from the room 1 through conduit 14 upwardly through the chamber 7 and out through the opening 25 in the roof. As soon as the chamber 7 becomes cool, the direction of the air reverses, and it then flows downwardly through the chamber 7 and into the room. If there is a south wind blowing this downward flow may be started sooner if the opening 25 at the north end of the eaves of the roof is closed, while the corresponding opening (not shown) at the south end of the roof is open. It is therefore possible to control in some measure the beginning of the downward flow of air through the chamber 7 by means of covers on the openings 25. The lid 20 can also serve to regulate the amount of air flow if the wind is blowing at a high velocity.

During the forenoon the chamber 9 is thoroughly heated by the sun radiation, and since this chamber is inclined the heated air ascends to the ridge of the roof. This flow of air may be aided by the south wind, especially if the opening 26 is uncovered, so that the wind produces a sucking effect at the north edge of the roof. If there is a north wind the opening 26 should be closed and the corresponding opening on the south edge of the roof opened in order to attain the same effect.

Moreover, during the late forenoon the chamber 10 is being prewarmed by the sun. As described above in connection with the chamber 9, the air may likewise be caused to pass through the chamber 10 by manipulating a cover on the opening 27. During the prewarming, however, it is desirable that the flow of air through the chamber 10 be rather small.

During the time in the forenoon when the material in the chamber 9 is being activated, that in the chamber 7 becoming cooled, and that in the chamber 10 becoming preheated, as mentioned above, the absorption material in the chambers 8 and 12 is used to condition the air in the room 1. Assuming the material in these chambers 8 and 12 has been previously activated and is in a dry condition, the material may be used to dry the air supplied to the room. To accomplish this, fresh air may be caused to enter the chamber 8 through the opening 28 and after flowing downwardly through the chamber 8 where the absorbent material absorbs the moisture from the air, the air enters the room through the opening 15. This downward flow through the chamber 8 may be aided if a south wind is blowing by manipulating the covers on the openings 26. At the same time the material in the chamber 12 may be used to dry the air in the room 1. In this case the air to be conditioned does not come from the outside but comes from the room 1. It may enter the chamber 12 through the opening 19 and after passing downwardly through the chamber 12 where it is dried, re-enter the room through the opening 18.

In any case where it is desired to cool the air entering the room 1, wetted surfaces should be provided where the dry air leaves one or the other of the absorption vessels, and since this air is very dry evaporative cooling can be effected merely by bringing it into contact with these wetted surfaces. While such evaporative cooling devices may be associated with any one of the vessels used to dry the air, the drawing illustrates them only in connection with the chambers 9 and 10 where the evaporative cooling disks 24 are illustrated. The location illustrated is particularly desirable during the night time.

As the position of the sun changes with respect to the house, the chamber 7, and later the chamber 9, comes into the shade, at which time the chamber 10 will be fully exposed to the sun and the chamber 8 comes into the range of the sun for preheating. The drying of the air passed into the room 1 is now the same as described above for operating conditions in the forenoon, except that now the chamber 7 may serve for the drying of the air entering the room, in addition to that brought about in the chamber 12. It is obvious that as the sun shines on the chamber 8, the material therein becomes activated and the moisture which was absorbed during the forenoon is driven off.

Still later in the day after the sun has gone down, fresh air can then enter the room 1 through all the four chambers 7, 8, 9 and 10. It is desirable, however, to so connect these chambers to the room 1 that the material in the chambers 9 and 10 only serves for air conditioning during the night. In this way the material in the chambers 7 and 8 may more effectively dry the air during the daytime as described above. At any time during the night the material in the chamber 12 may be heated by means of the burner 30 so as to activate it. When this material is heated, air should be passed in contact with it and this air may enter the chamber 12 through the conduit 18 and after passing upwardly through the chamber 12 be discharged to the atmosphere.

When the chambers 9 and 10 are used to dehumidify or cool the air entering the room 1, fresh air may enter these chambers through the openings 26 and 27 and after flowing downwardly therethrough become dried, pass over the wetted surfaces 24 and enter the room. This same air may leave the room through the opening 18 or through the opening 19 connected to the chamber 12, this flow of air being regulated by the lids 21 and 22.

Thus in the manner described above, the room 1 of the arrangement of Figures 1, 2 and 3 may be furnished with conditioned air in the day time as well as in the night time although there is an operating cost only during the night time. It will also be apparent that in this arrangement the air to be conditioned always passes downwardly through the chambers before entering the room, while the air used for activating or regenerating the material passes upwardly through these chambers. The passage of air through the chambers in this manner can be accomplished without the use of any valves or fans or pumping devices but may be brought about merely by the changes in density of the air in the chambers due to the heating and cooling thereof. As indicated above, it is advisable, however, to arrange adjustable lids or covers for some of the openings so as to regulate the intensity of the air flow through the various chambers. In order to render the use of fans unnecessary the resistance to air flow in the various chambers which contain the absorption material should be low, and this may be accomplished by suitable spacing means which prevent the absorption material from packing.

Referring now to the arrangement of Figures 4 to 6 inclusive it will be seen that a railroad car is there illustrated as provided with four absorption vessels at the corners thereof. For purposes of simplicity in illustrating, the absorption vessels are shown outside of the car, although in practice it will probably be more practical to locate them on the inside.

In Figures 4 and 5 a railroad car is illustrated at 31 and the absorption vessels are illustrated in Figure 4 by the numerals 32, 45, 46 and 47. All of these absorption vessels are alike and only one will be described in detail. Thus in the arrangement of Figure 5 the absorption vessel 32 is shown in some detail and as illustrated in Figure 6 the vessel may be heated by means of a heating device such as a steam pipe 33. The lower end of the vessel 32 may be connected to the atmosphere by means of an opening 34, while the upper end is connected to the atmosphere by means of a conduit 35. These conduits may be protected by screens or the like to prevent the entrance of foreign material, and a fan 36 may be provided in one of them, as in conduit 34, to cause circulation of outside air through the absorption vessel. The upper end of the vessel 32 is also connected to the atmosphere by means of an opening 37 which may also be provided with a screen or filter and air may be sucked in through this opening 37 and after passing downwardly through the vessel 32 pass into the vertically extending conduit 39 which is connected to the lower end of the vessel 32 and to the top of the railroad car 31. A fan 38 may be located in the car to promote this circulation. If desired, the fan 38 may be reversed and cause air to flow from the car 31 downwardly through the conduit 39 and upwardly through the vessel 32 so that it leaves this vessel at the top thereof.

To provide means for evaporative cooling in the air stream which enters the car after it has been dried by passing through the absorption vessel, rotatable disks 40 are provided and these disks may dip into water container 41, this arrangement being similar to that shown at 24 in Fig. 1. Suitable means for distributing the air in the car may be connected to the chamber housing the evaporating cooling means 40 at a point adjacent the screen 42 and fan 38, but this distributive means is not shown in the drawings. Air conduits may also interconnect the four absorption vessels 32, 45, 46 and 47 so that any air which has been dried by one of these vessels but which is not necessary for maintaining the proper conditions in the car may serve to more efficiently regenerate or activate the heated absorption material in another of the absorption vessels.

As indicated in Figure 6, each of the absorption vessels 32, 45, 46 and 47 may have the absorption material therein supported by a partition 43 which divides the vessel into two parts. The partition 43 is made up of a number of parallel walls the alternate ends of which are connected to form a zig-zag arrangement. These walls may, for example, be formed of small wooden sheets or laminations. They may be covered with water-tight layers on those sides which are not exposed to the activating air. If made of wood these sheets supplement the absorption action of the material supported thereby, which may consist for example of silica gel. The space to the right of the partition 43 as well as open spaces illustrated at 44 in Figure 6 between the vertically extending wooden sheets may be used as a passage through which the cooling or heating air is caused to flow by means of fan 36, and it is this side of the partition which has the water-tight cover. This arrangement provides a good heat transfer between the air and the absorption material so that it is unnecessary to employ a cycle of operation of short duration.

The space to the left of the partition 43, as viewed in Figure 6 contains the absorbent material. Air is circulated through this side of the vessel by the fan 38.

The arrangement of Figures 4, 5 and 6 may be operated as follows: First the absorption vessel 32 is heated by steam pipe 33 and atmospheric air is circulated upwardly through passage 44 to heat and liberate the moisture in absorbent material 43. At the same time fan 38 is operated in a direction to direct air from the car over material 43 and out opening 37 to carry away the liberated moisture. The fresh air enters the car 31 through the pre-cooled absorption vessel 46 which it is assumed has previously been activated. The air thus enters the car 31 in a dry state and any excess air is led to the absorption vessel 32 to aid in the regeneration or activation taking place therein. After a certain time heat is supplied to absorption vessel 47 to preheat it and after preheating a certain time fans 38 on the absorption vessels 32 and 46 are turned off and the fans 38 on the absorption vessels 47 and 45 are turned on. The fresh air then flows to the car 31 through the activated material in the absorption vessel 45 and the part not used in the car enters the heated absorption vessel 47 to aid in the activation process going on therein. After a time the absorption vessel 32 cools off and preheating is started on the vessel 46, no air being circulated through the vessel 32 and the vessel 46 at this time.

Next, the fans cause the air entering the car 31 to flow through the absorption vessel 32 while air is exhausted from the car through the heated absorption vessel 46, the vessel 47 then being pre-cooled and the absorption vessel 45 preheated.

Finally, to complete the cycle, air is circulated through the heated vessel 45 while the absorption vessel 47 is used to condition the air entering the car, the vessel 46 then being pre-cooled and the vessel 32 preheated. If the apparatus is operated as described, the air in the car is continuously dehumidified and it may be cooled by evaporative cooling as mentioned above. It is possible to so connect the absorption vessels to the car that the exhaust air from the car is conducted to the outside through the heated abductor sorption vessels. In this way the dried air flowing to the car passes in heat exchange relation with the exhaust air. This arrangement aids in regeneration of the absorption material. It is also of particular advantage in cases when the humidity of the outside air is high to use the exhaust air from the car rather than outside air for purposes of activating the absorption material. In each of the vessels 32, 45, 46 and 47 the absorption of water out of the air and the activation of the absorption material may take place as follows, the explanation being with reference to the vessel 32:

As the full heating of the material begins with the aid of the heating device such as the steam pipe 33, the fan 38 is turned on and this forces the exhaust air from the car 31 through the channel 39 and upwardly through the absorption material located between the spacer members 43. As this air passes upwardly through this material it takes up a quantity of water therefrom, this water being that which was absorbed by the substance when it was saturated during the previous part of the cycle of operation. After passing upwardly through this material, the activating air flows into the atmosphere through the conduit 37. After the material is activated the heat is turned off and the fan 36 is turned on and the fan 38 turned off. The cooling of the absorption material then starts for cooling air is forced up through the channels 44 and leaves the apparatus through the opening 35. It is important to note that this cooling air does not come in actual contact with the absorption material but only in heat transfer relation therewith.

After the material is cooled the fan 38 is turned on again, but now its direction is reversed so that it sucks fresh air in at 37 and causes this fresh air to flow downwardly through the absorption material between the spacing members 43 and then upwardly through conduit 39 so that it enters the car 31. As it enters it passes over the moistened surfaces 40 and is cooled to some extent by evaporative cooling, although in most cases the amount of moisture taken up is still not sufficient to bring the humidity up to a value as high as that of the air which enters at 37. During the time that the absorption material is being used to dry the air entering the car the heat of absorption is discharged to the cooling air flowing upwardly in heat exchange relation with the absorption material but not in contact therewith, this circulation of cooling air being caused by fan 36. After the vessel 32 has been used for drying the air which enters the car 31, both fans 36 and 38 are turned off and steam is again supplied to pipe 33 which starts the heating of the material in the vessel 32. This part of the heating period is called pre-heating, no air being passed through the material or in heat exchange relation therewith at this time.

In the arrangement illustrated no valves are necessary because the resistance to flow of air through the absorption vessels is normally sufficient to prevent any substantial air flow when the fans are turned off. The fans may be so designed and the distribution system in the car may be such that when a fan is operating there is just sufficient pressure for supplying the various compartments of the car with conditioned air. It is also to be noted that in the arrangement of Figures 4 to 6 the flow of air through the absorption vessels is upwardly during the activating operation of the period and downwardly during the drying operation of the period.

A still further embodiment of the invention is illustrated in Figures 7 to 10. In this structure a portable apparatus is provided for cooling air and the invention takes the form of a cylinder upon which the absorption material is mounted.

Thus, an axle 51 is mounted for rotation in a frame 52. A plurality of pipes 54 are supported by end disks 60 in a cylindrical arrangement. The lefthand portion of these pipes 54 are imbedded in heat insulating material 53, as viewed in Figure 7. The righthand ends of the pipes 54, as viewed in Figure 7, project out of the heat insulating material 53 and this portion of the pipes is filled with absorbent material such as is illustrated at 55. This material may be silica gel, for example, and it may be arranged in baskets or metal screens so as to be supported in such a way that it will not pack and to take care of any expansion of the material. In the portions of the pipes 54 which are imbedded in the insulating material elements for storing heating are located, these elements being designated 56 and being held in position by means of wire screens. The elements 56 do not absorb moisture from the air or give up moisture to the air but are used only to remove or add heat to the air passing therethrough as will be described hereinafter.

For rotating the cylindrical arrangement of pipes about the axle 51, gear wheels 58 and 59 are provided, these being mounted upon the shaft 57 and meshing respectively with the driven gear 60 keyed or otherwise secured to the shaft 51 and the driving gear 68 which may be driven by any suitable means not shown. The gear wheel 60 on the shaft or axle 51 may be made of vulcanized rubber or similar material having low heat conductivity. It is of course provided with a number of holes through which the pipes 54 extend.

While the arrangement of Figure 7 does not illustrate the wall of the building it may be stated that the portion to the left of the gear 60, as the arrangement is viewed in Figure 7, may be located in the room to be conditioned, while the portion of the apparatus on the righthand side of this disk may be exposed to the open atmosphere on the outside of the building.

On the righthand side of the shaft 57 as viewed in Figure 7 suitable suspending clamps 61 are provided, these being mounted on a sleeve which does not partake of the rotation of the shaft. These clamps support a semi-cylindrical body of insulating material 63 best shown in Figure 9. A second semi-cylindrical body of insulating material 64 is supported beneath the body 63 by means of a bracket connected to the frame 52, the body of insulating material 64 being of smaller diameter and being located sufficiently below the body 63 to enable the pipes 54 to pass therebetween, the insulating bodies 63 and 64 being in spaced concentric relation.

Electrical heating elements 62 and 65 are mounted on surfaces of the insulating bodies 63 and 64 which are adjacent to the pipes 54 located therebetween. These heaters, together with the heat insulating material 63 and 64 form a heater which tends to prevent the heat from escaping. The heat is transferred to the pipes 54 mainly by radiation.

On the lefthand portion of the frame 52 a fan 67 is mounted and is driven by the same shaft which drives the gear 68. This fan may be so associated with the pipes 54 as to cause air to flow from left to right therethrough, as viewed in Figure 7, when these pipes are located between the two insulating semi-cylinders 63 and 64. As the air flows in this direction it may be cooled to some extent by an evaporative cooler similar to that illustrated at 24 in Figure 1, the arrangement shown in Figure 7 consisting of a plurality of disks of porous material as indicated at 70, these being adapted to rotate and dip into a pan of water, as illustrated at 71. These disks may be rotated by suitable clockwork having an adjustable speed.

A second fan 66 is shown in Figure 7 and also in Figure 9, this fan being so located as to cause air to flow from right to left as viewed in Figure 7, both through and around pipes 54 when these pipes pass across the lower portion of the apparatus. As air passes through the pipes 54 from right to left under the influence of fan 66 evaporative cooling may be used to cool the air leaving the lefthand end of these pipes, a second evaporative cooler 69 being illustrated in Figure 7.

In this apparatus the heaters and the direction of rotation of the fan remains the same throughout the operation, the absorption material being moved. The fan 66 always blows air from right to left as viewed in Figure 7 and the fan 67 always blows air from left to right during the time when the absorption material 55 is being heated.

The operation of the device of Figures 7 to 10 is as follows: Assuming that the material in the lower pipes 54 has been previously activated, this material as it passes in front of the fan 66 is subjected to a blast of air from right to left as viewed in Figure 7 so that this outside air is blown through the pipes 54 and in the room to be conditioned. In passing through these pipes it is first dried by the absorption material 55 and then if the material 56 has been previously cooled by the passage thereover of air cooled by evaporative cooler 70, the air is brought to a low temperature and directed into the room to be conditioned across the evaporative cooler 69 where its temperature may be still further lowered. At the same time air from the room is directed by the fan 67 across the evaporative cooler 70 where it is cooled to a temperature lower than that prevailing in the room and it is blown across the material 56 in the upper pipes 54 so that this cold blast of air reduces the temperature of the material 56 sufficiently to enable this material to cool the air entering the room when it is rotated to the lower portion of the apparatus. At the same time the air passing from left to right through the upper pipes 54 is heated to a slight extent as it passes across the material 56 since this material has just been rotated from the lower portion of the apparatus where it has been removing moisture from atmospheric air flowing to the room to be conditioned.

After passing across the material 56 in the upper pipes 54 the air blown from left to right is used to aid in the activation of the absorbent material in the upper pipes 54 and to carry away the moisture liberated therefrom by the heat from electric or other heaters 62 and 65.

Since the pipes 54 are constantly rotated at a slow speed they are subjected to a cycle in which the absorbent material therein is first preheated as material comes within the influence of the heaters but before the blast of air caused by the fan 67 is directed therethrough, then heated and activated as air is passed therethrough, then precooled as it passes downwardly, but before it is subjected to the blast of air caused by the fan 66 and finally used to dry the air as it passes under the influence of the fan 66.

Simultaneously the material 56 is alternately subjected to a warm blast of air as it passes across the lower part of the apparatus, and a cold blast as it passes across the upper part of the apparatus so that the cold generated by the evaporation from the disk 70 is transferred to the air entering the room through the lower pipes 54 before this air passes across the evaporative cooler 69.

Since the air passes in opposite directions through the absorbent material it also passes in opposite directions through the cold storing material 56. In this way a practical apparatus is provided without any valves being employed.

Where the apparatuses described above are used in a moist climate it is advisable to moisten the disks less and warm the air more; if the climate is warm, it is advisable to cool the air more and moisten the disks more.

While only three embodiments of the invention have been shown and described herein, it is obvious that various changes may be made without departing from the spirit of the invention or the scope of the annexed claims.

I claim:

1. Apparatus for conditioning the air in a building the roof of which has a ridge extending north and south with portions sloping downwardly from the ridge to the east and the west, said apparatus including containers having absorption material therein, one of said containers being located on the east portion of said roof and another container being located on the west portion thereof, means connecting one end of each of said containers to the atmosphere outside of said building, and means connecting the other end of each of said containers to the inside of the building, the arrangement being such that when the sun shines on said containers, air is caused to flow upwardly through the absorption material therein and dry the material in passing from the interior to the exterior of said building and when said containers are in the shade air is caused to flow downwardly through the absorption material to dry the air in passing from the exterior to the interior of said building.

2. Apparatus for conditioning the air in a building, different parts of the walls and roof of the building being exposed to the sun at different times of the day, said apparatus including at least four compartments having absorption material therein, the compartments being so located on the walls or roof of the building in such a way as to be exposed to the sun in succession during the daytime, means for connecting each of said compartments to the exterior and to the interior of said building, the arrangement being such that when the sun shines on said containers, air is caused to flow upwardly through the absorption material therein and dry the material in passing from the interior to the exterior of said building and when said containers are in the shade air is caused to flow downwardly through the absorption material to dry the air in passing from the exterior to the interior of said building.

3. Air conditioning apparatus comprising a vessel having absorbent material therein, said vessel having means therein for maintaining said material in a position such that it may be exposed to a current of air to be conditioned, said means including a partition dividing the vessel into two chambers, the partition itself being made of absorbent material and having one side arranged to be exposed to the current of air to be conditioned, the other side of said partition being coated with a layer of impervious material, means for passing a current of air to be conditioned through said vessel on one side of said partition in contact with the absorption material to condition said air and means for passing another current of air through said vessel on the other side of said partition to cause a transfer of heat between the last mentioned current of air and said absorption material through said layer of impervious material.

4. The combination with a railroad car of an arrangement for drying and cooling air supplied to the car, said arrangement consisting of a plurality of compartments each containing absorption material, means for causing a current of air to be conditioned to flow, when desired, from outside the car through a selected one of said compartments and into the car, and means for causing a current of cooling air to flow from outside the car through a selected one of said compartments and back to the outside of the car and means for selectively heating said compartments, each of said compartments having structure therein for supporting the absorbent material in such a way as to bring it into intimate contact with the current of air to be conditioned and also providing a large exposed surface to transfer heat from the material to the current of cooling air and, said heating means including an impervious wall separating the absorption material from the source of heat.

5. Apparatus for conditioning air comprising a plurality of compartments each of which has a body of absorbent material and a body of heat-storing material therein, heating means for successively heating the absorbent material in said compartments, cooling means for successively cooling the absorbent material in said compartments, means for causing air to be conditioned to flow successively through the compartments as the absorbent material therein is cooled, this air passing first through the absorbent material in each compartment and then through the heat storing material therein, whereby heat will be transferred from the air to the heat storing material, and means for causing activating air to flow successively through said compartments as the absorbent material therein is heated, this activating air passing first through the heat-storing material in each compartment so as to remove the heat taken by this material from the air to be conditioned and then through said absorbent material to aid in the activation of said material.

6. Apparatus for conditioning air comprising a plurality of compartments each of which has a body of absorbent material and a body of heat-storing material therein, heating means for successively heating the absorbent material in said compartments, cooling means for successively cooling the absorbent material in said compartments, means for causing air to be conditioned to flow successively through the compartments as the absorbent material therein is cooled, this air passing first through the absorbent material in each compartment and then through the heat-storing material therein, whereby heat will be transferred from the air to the heat-storing material, means for causing activating air to flow successively through said compartments as the absorbent material therein is heated, this activating air passing first through the heat-storing material in each compartment so as to remove the heat taken by this material from the air to be conditioned and then through said absorbent material to aid in the activation of said material, and means for cooling the activating air just prior to its entrance into a compartment whereby the heat-storing material subjected to the activating air may have its temperature materially reduced.

7. The method of drying and cooling air to condition it which includes the steps of cooling a body of heat-storing material by forcing a blast of cool air over it, passing the air being conditioned over a body of absorbent material to dry the same and then over the body of cooled, heat-storing material to cool the air being conditioned.

8. The method of drying and cooling air to condition it which includes the steps of first treating a quantity of air to lower its temperature by causing water to evaporate into it, conveying this cooled air having a high moisture content into heat transfer relation with a body of cold-storing material to lower the temperature of the cold-storing material, then passing a quantity of air being conditioned in contact with water absorbing material to dry the air being conditioned and then in heat transfer relation with said cooled cold-storing material to cool the dried air.

9. The method of continuously conditioning the air in a room which includes the steps of exposing bodies of absorbent material to the action of solar heat and to air leaving the room to reactivate the same and to induce flow of air through the room, conditioning the air entering the room by contact with a body of activated absorbent material not subjected to solar heat, conditioning the air in the room at night by contact with a body of absorbent material activated in the daytime, exhausting the used conditioned air during the night by heating a rising column of air, and activating a body of absorbent material by contact with said rising column of heated air.

10. Apparatus for conditioning the air in a building comprising a plurality of bodies of absorbent material mounted in compartments in the walls and roof of the building whereby different bodies of absorbent material are exposed to the action of solar heat at different times of the day, conduits connecting each of said compartments at its lower end to the interior of the building, a plurality of outlets from each of said compartments at the upper ends thereof facing in different directions, the arrangement being such that air to be conditioned flows downwardly through compartments not subjected to solar heat into the building and air leaving the building flows upwardly through compartments subjected to solar heat to activate the absorbent material, and movable covers on said outlets whereby flow of air into said compartments may be accelerated by opening outlets facing into the wind and flow of air outwardly of said compartments may be accelerated by opening outlets facing from the wind.

11. Apparatus for conditioning the air in a building having a plurality of walls including a roof, different parts of said walls being exposed to the sun at different times of the day, said apparatus including at least four compartments having communication with the interior of the building and with the atmosphere and containing absorption material therein, at least three of said compartments being disposed on the walls of said building in such a way as to be successively exposed to the sun during different portions of the day, and another of such compartments being so located on said building as to be protected from the sun at all times, said last mentioned compartments having artificial heating means associated therewith, and said compartments being so positioned that, when heated, air flows in one direction therethrough, and when not heated, air flows in the opposite direction therethrough to be conditioned.

12. Apparatus for conditioning the air of an enclosure comprising at least four separate air conditioning chambers, each having absorbent material therein and each of which communicates with the atmosphere and with said enclosure, means for passing air through the material in each of said conditioning chambers independently of the other of said chambers, means for transferring heat from a heat source to the material in certain of said chambers and means for cooling certain other of said chambers, the arrangement being such that the material in each chamber may be successively preheated preparatory to reactivating the same, simultaneously heated and dried, precooled and simultaneously cooled and subjected to a current of air to be conditioned.

13. Apparatus for conditioning the air of an enclosure comprising at least four separate air conditioning chambers, each having absorbent material therein and each of which is in communication with the atmosphere and with said enclosure, means for passing air through the material in each of said chambers independently of the other chambers, means for transferring heat from a heat source to the material in said chambers and means for cooling said chambers, the arrangement being such that the material in each chamber may be successively preheated preparatory to reactivating the same, simultaneously heated and dried, precooled, and simultaneously cooled and subjected to a current of air to be conditioned, the arrangement also enabling the passage of air to be conditioned through the material in one or more of said chambers at the same time while the material in other of the chambers is being reactivated whereby a substantially continuous supply of conditioned air is available for said enclosure.

14. The method of conditioning the air of a space by means of hygroscopic material which comprises passing a stream of atmospheric air over hygroscopic material in condition to absorb moisture uniformly throughout the area of said stream, delivering the resulting stream of conditioned air to said space, simultaneously preheating another body of hygroscopic material preparatory to reactivating the same, then passing a stream of previously conditioned air from said space over said preheated material while said material continues to be heated whereby the same is reactivated, and finally precooling said newly reactivated body of material preparatory to utilizing the same in conditioning additional air for said space.

EDMUND ALTENKIRCH.